United States Patent
Sakurai et al.

(10) Patent No.: US 7,528,825 B2
(45) Date of Patent: May 5, 2009

(54) INPUT PEN AND INPUT DEVICE

(75) Inventors: Satoshi Sakurai, Shinagawa (JP);
Nobuo Yatsu, Shinagawa (JP); Keita Harada, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 677 days.

(21) Appl. No.: 11/006,743

(22) Filed: Dec. 8, 2004

(65) Prior Publication Data

US 2005/0122319 A1 Jun. 9, 2005

(30) Foreign Application Priority Data

Dec. 8, 2003 (JP) .............................. 2003-408548

(51) Int. Cl.
*G06F 3/033* (2006.01)
*G09G 5/00* (2006.01)
(52) U.S. Cl. ...................................... 345/179; 345/156
(58) Field of Classification Search ................. 345/156, 345/179
See application file for complete search history.

(56) References Cited

U.S. PATENT DOCUMENTS

| | | | | |
|---|---|---|---|---|
| 5,357,062 A | * | 10/1994 | Rockwell et al. | 178/19.04 |
| 5,635,683 A | * | 6/1997 | McDermott et al. | 178/19.04 |
| 5,717,423 A | * | 2/1998 | Parker | 345/108 |
| 6,188,392 B1 | * | 2/2001 | O'Connor et al. | 345/179 |
| 6,879,316 B2 | * | 4/2005 | Kehlstadt et al. | 345/163 |

FOREIGN PATENT DOCUMENTS

| | | |
|---|---|---|
| JP | 5-87633 | 11/1993 |
| JP | 7-261906 | 10/1995 |

OTHER PUBLICATIONS

Shigley, J.E.; Mischke, C.R. (1996). Standard Handbook of Machine Design (2nd Edition). (title page and pp. 24.23-24.26). McGraw-Hill. Online version available at: http://knovel.com/web/portal/browse/display?_EXT_KNOVEL_DISPLAY_bookid=733&VerticalID=0.*

* cited by examiner

*Primary Examiner*—Amare Mengistu
*Assistant Examiner*—Robert R Rainey
(74) *Attorney, Agent, or Firm*—Staas & Halsey LLP

(57) ABSTRACT

An input device includes an input pen that is capable of detecting an amount of a pen pressure applied to a pen tip. The input pen has a resistance film that alters a resistance vale thereof according to a touch area, a spring that alters the touch area between the spring and the resistance film, a pen pressure detecting circuit that detects the amount of the pen pressure applied to the pen tip based on the touch area, and an infrared output circuit that outputs the amount of the pen pressure to a receiver with the use of infrared rays. The spiral-shaped spring is configured so that a diameter may become smaller as further from the pen tip. It is thus possible to detect the amount of the pen pressure applied to the pen tip based on the touch area that varies according to a movement of the pen tip, and thereby possible to express different line widths in drawing according to the amount of the pen pressure applied to the pen tip.

5 Claims, 11 Drawing Sheets

FIG. 10
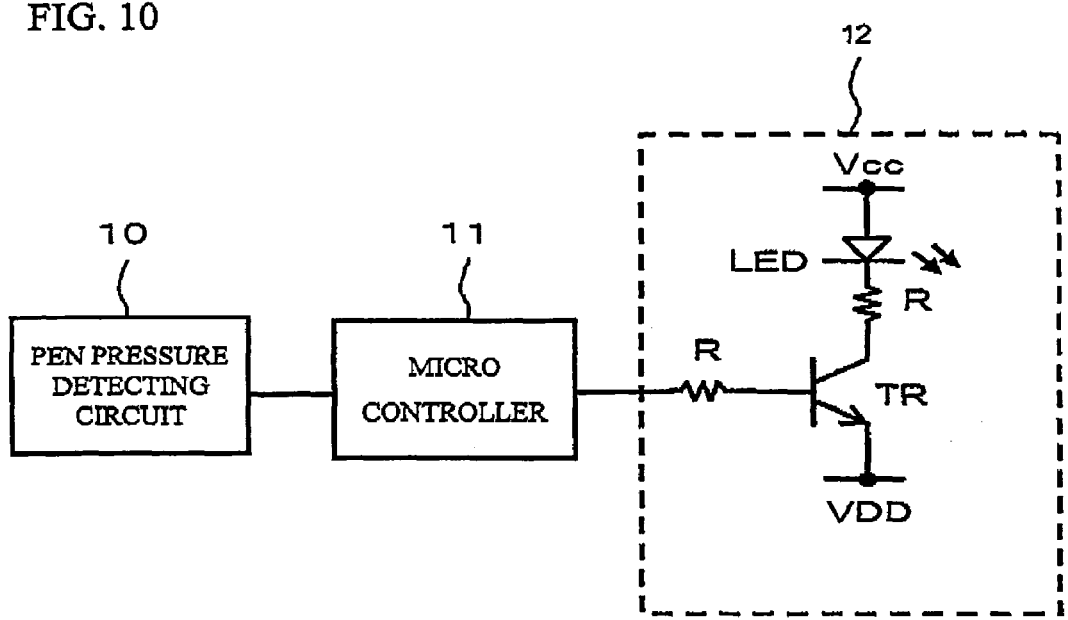
FIG. 11A
INFRARED PULSE PATTERN
WHEN PEN PRESSURE IS SMALL
FIG. 11B
INFRARED PULSE PATTERN
WHEN PEN PRESSURE IS MEDIUM
FIG. 11C
INFRARED PULSE PATTERN
WHEN PEN PRESSURE IS LARGE
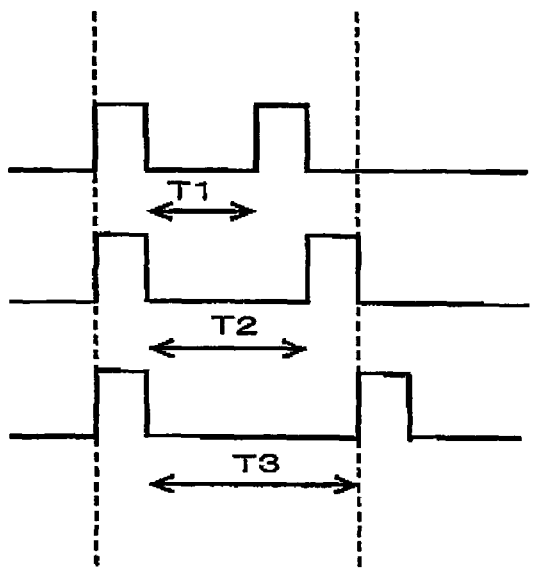

FIG. 12
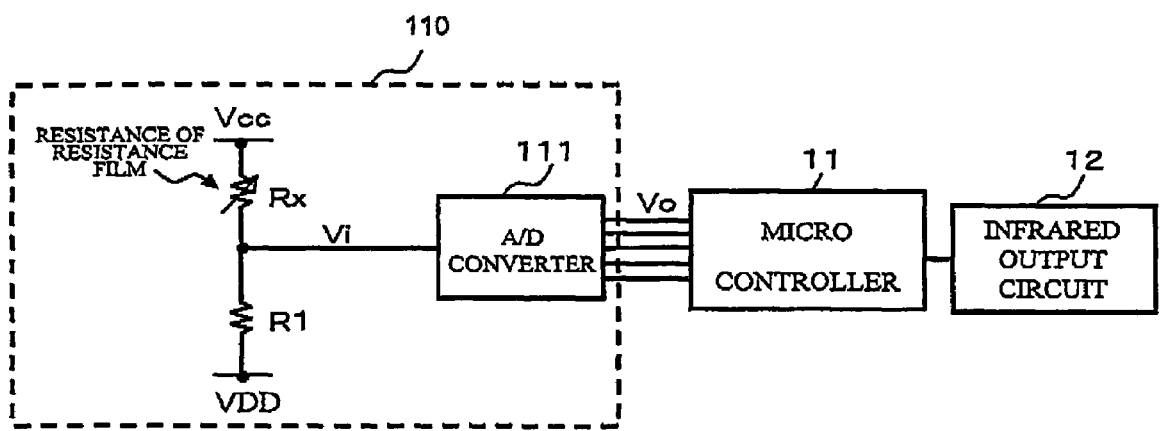
FIG. 13A
DATA (001 = 1)
FIG. 13B
DATA (011 = 3)
FIG. 13C
DATA (111 = 7)
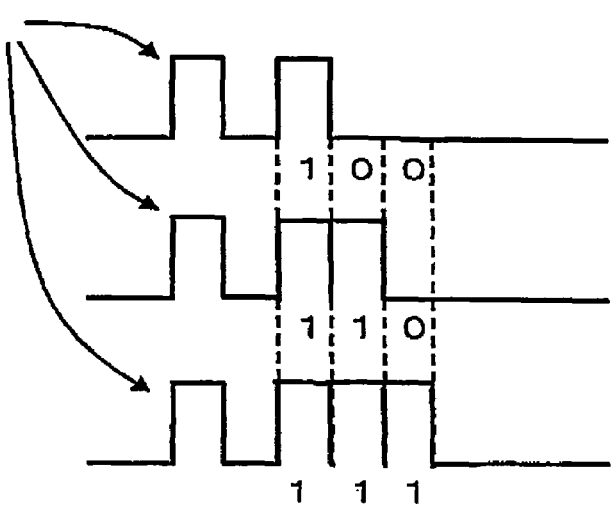

INPUT PEN AND INPUT DEVICE

BACKGROUND OF THE INVENTION

1. Field of the Invention

This invention generally relates to an input pen and input device.

2. Description of the Related Art

A conventional pen-type coordinate input device does not include a function of detecting a pen pressure on a transmitter, in the case where the conventional input device employs another method rather than a tablet method, which utilizes electromagnetic waves, for example, an ultrasonic method. Therefore, the transmitter was able to transmit only two types of information to a receiver, writing or not writing.

Accordingly, it was impossible to change a line width in drawing depending on the pen pressure sensed by the transmitter, with an application software on a host machine that is connected to the receiver. There is the drawback in that a drawing is expressed with a given line width only. The techniques have been proposed by Japanese Patent Application No. 7-261906 (hereinafter referred to as Document 1) and Japanese Patent Application No. 5-87633 (hereinafter referred to as Document 2) so as to solve the above-mentioned drawback.

Document 1 discloses a device that intermittently outputs several different patterns of electric waves from a pen tip, according to an output signal of a pressure sensor to which the pen pressure of the pen tip is applied. The position of the pen tip and the intermittent pattern that is formed by detecting the electric waves are decrypted with the signals detected by a pen position detecting sensor in order to determine the line width to be displayed on a flat panel. It is thus possible to draw lines and characters having various expressions in the same manner as drawing the lines and characters on a paper with a calligraphy-brush.

Document 2 discloses a device including a magnetism-generating element and a hall element so that an output from the hall element is applied to the tablet as pen pressure information. The output from the hall element varies corresponding to the changes in an up-and-down movement of a pressing member.

The device in Document 1 detects the pen pressure of the pen tip with the pressure sensor; however, it is also possible to detect the pen pressure of the pen tip with another method. The device in Document 2 detects the pen pressure of the pen tip with the magnetism generating element and the hall element; however, it is also possible to detect the pen pressure of the pen tip with another method.

SUMMARY OF THE INVENTION

The present invention has been made in view of the above-mentioned circumstances and provides an input pen and input device that are capable of detecting the amount of the pen pressure applied to the pen tip with another method rather than the above-mentioned conventional techniques.

According to an aspect of the present invention, there is provided an input pen in use for an input device including a first member, a second member that moves together with a pen tip, a touch area between the first member and the second member being variable, and a pen pressure detecting circuit that detects an amount of the pen pressure that is applied to the pen tip, based on the touch area. It is possible to detect the amount of the pen pressure applied to the pen tip according to the touch area that varies with the movement of the pen tip, and thereby possible to express the different line widths according to the amount of the pen pressure.

In the above-mentioned input pen, the first member is a resistance film, a resistance value of which varies according to the touch area. It is thus possible to detect the amount of the pen pressure applied to the pen tip based on the resistance value of the resistance film that varies with the touch area.

In the above-mentioned input pen, the second member is an elastic material, and the touch area varies according to a movement of the pen tip. It is thus possible to alter the touch area according to the movement of the pen tip.

In the above-mentioned input pen, the elastic material is a spring, a diameter in spirals of which becomes smaller as a distance from the pen tip increases. It is thus possible to alter the touch area according to the movement of the pen tip.

In the above-mentioned input pen, the elastic material is made of rubber. It is thus possible to alter the touch area according to the movement of the pen tip.

In the above-mentioned input pen, the second member is a resistance film, a resistance value of which varies according to the touch area. It is thus possible to detect the pen pressure applied to the pen tip based on the resistance value of the resistance film that varies according to the touch area.

In the above-mentioned input pen, the first member is an elastic material, and the touch area varies according to a movement of the pen tip. It is thus possible to alter the touch area according to the movement of the pen tip.

In the above-mentioned input pen, the elastic material is a spring, a diameter in spirals of which becomes smaller as a distance from the pen tip increases. It is thus possible to alter the touch area according to the movement of the pen tip.

In the above-mentioned input pen, the elastic material is made of rubber. It is thus possible to alter the touch area according to the movement of the pen tip.

According to another aspect of the present invention, there is provided an input pen in use for an input device including a light emitting element that moves together with a pen tip, a light-sensitive element that receives light emitted from the light emitting element, and a pen pressure detecting circuit that detects an amount of the pen pressure that is applied to the pen tip, according to an amount of the light received by the light-sensitive element. It is possible to detect the amount of the pen pressure applied to the pen tip according to the touch area that varies with the movement of the pen tip, and thereby possible to express the different line widths according to the amount of the pen pressure.

According to still another aspect of the present invention, there is provided an input pen in use for an input device including a light emitting element, a light-sensitive element that moves together with a pen tip and that receives light emitted from the light emitting element, and a pen pressure detecting circuit that detects an amount of the pen pressure that is applied to the pen tip, according to an amount of the light received by the light-sensitive element. It is possible to detect the amount of the pen pressure applied to the pen tip according to the touch area that varies with the movement of the pen tip, and thereby possible to express the different line widths according to the amount of the pen pressure.

In the above-mentioned input pen, the light-sensitive element turns on according to a movement of the pen tip. It is possible to reduce the power consumed.

In the above-mentioned input pen, the pen pressure detecting circuit includes any one of multiple comparators and an A/D converter. It is thus possible to detect the amount of the pen pressure by comparing the comparators with a certain threshold value, and it is possible to express various pen pressure patterns by digitizing with the A/D converter.

In the above-mentioned input pen, further includes an infrared output circuit that outputs to a given receiver, an amount of the pen pressure detected by the pen pressure detecting circuit, with the use of infrared rays. It is possible to transmit the pen pressure information by wireless.

In the above-mentioned input pen, the infrared output circuit expresses the amount of the pen pressure by changing cycles between infrared pulses. The amount of the pen pressure can be expressed by changing the cycles of the infrared pulses.

According to yet another aspect of the present invention, there is provided an input device includes an input pen and a receiver, and the input pen in use for an input device includes a first member, a second member that moves together with a pen tip, a touch area between the first member and the second member being variable, and a pen pressure detecting circuit that detects an amount of the pen pressure that is applied to the pen tip, based on the touch area. It is thus possible to provide the input device that is able to detect the amount of the pen pressure and thereby possible to express the different line widths according to the amount of the pen pressure.

BRIEF DESCRIPTION OF THE DRAWINGS

Other objects, features and advantages of the present invention will become more apparent from the following detailed description when read in conjunction with the accompanying drawings, in which:

FIG. 10 is a circuitry example of an infrared output circuit;

FIGS. 11A through 11C show infrared pulse patterns outputted from the infrared output circuit;

FIG. 12 is a circuit diagram of the pen pressure detecting circuit in accordance with a second embodiment of the present invention;

FIGS. 13A through 13C show infrared output patterns from the infrared output circuit in accordance with the second embodiment of the present invention;

DESCRIPTION OF THE PREFERRED EMBODIMENTS

A description will now be given, with reference to the accompanying drawings, of embodiments of the present invention.

First Embodiment

Figure 1:
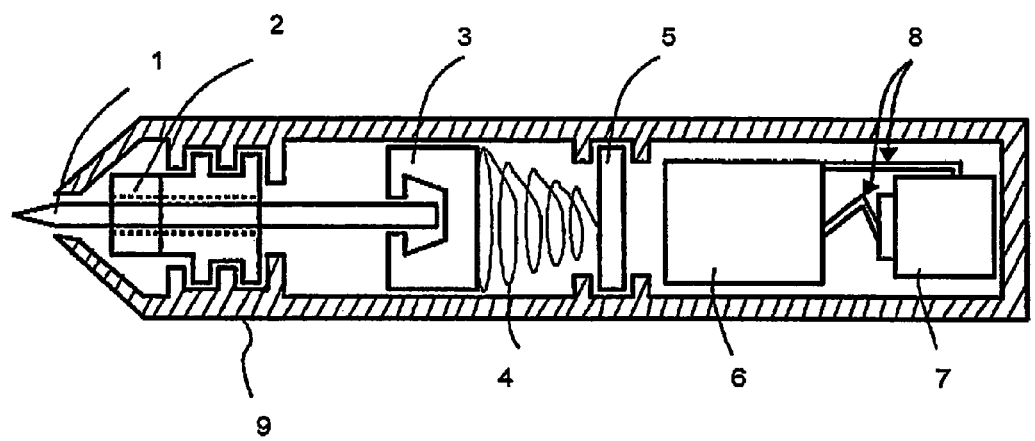
FIG. 1 is a cross-sectional view of an input pen of an input device in accordance with a first embodiment of the present invention.
Figure 2:
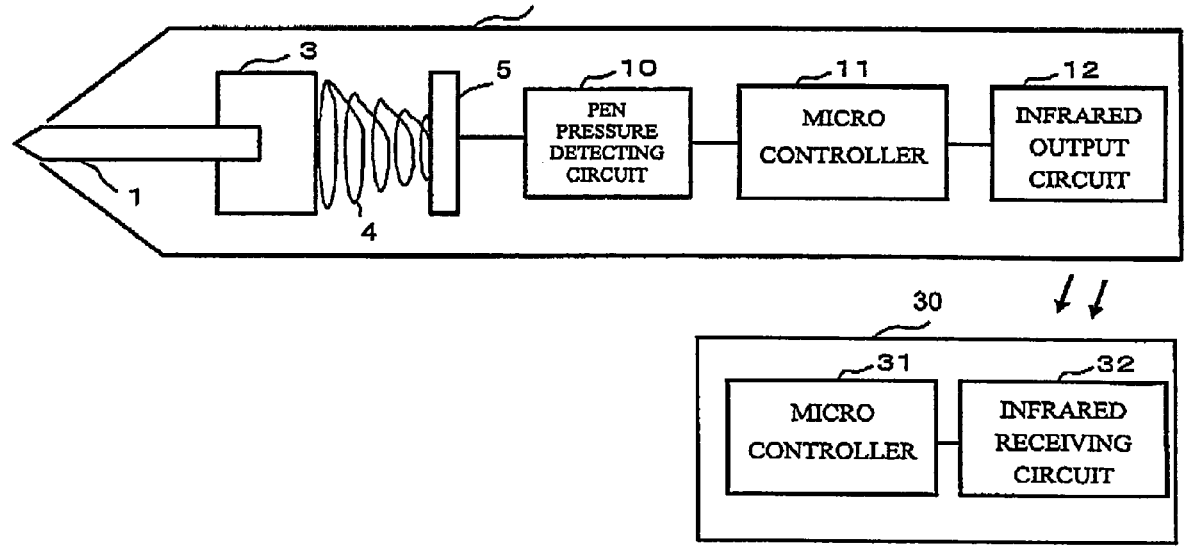
FIG. 2 is a block diagram of the input device in accordance with the first embodiment of the present invention.

FIG. 1 is a cross-sectional view of an input pen of an input device in accordance with a first embodiment of the present invention. FIG. 2 is a block diagram of the input device in accordance with the first embodiment of the present invention. Referring to FIG. 2, an input device 40 includes an input pen 20 and a receiver 30. Referring to FIG. 1, the input pen 20 includes a pen tip 1, an ultrasonic sensor 2, a pen tip holder 3, a spring 4, a resistance film 5, a circuit board 6, a battery 7, electrodes for battery 8, and a case 9. As shown in FIG. 2, the input pen 20 includes the pen tip 1, the pen tip holder 3, the spring 4, the resistance film 5, a pen pressure detecting circuit 10 that detects the pen pressure, a microcontroller 11, and an infrared output circuit 12.

The input pen 20 has a shape of a pen, and serves as a transmitter that transmits the pen pressure information to the receiver 30. The pen tip 1 is held by the pen tip holder 3. The ultrasonic sensor 2 senses ultrasonic waves for detecting coordinates. The detection of the coordinates may be performed by a publicly known method, and accordingly an explanation is omitted here. The pen tip holder 3 is provided for holding the pen tip 1.

The spring 4 shrinks and elongates according to the pen tip, and thus a touch area between the spring 4 and the resistance film 5 is variable. This spring 4 has a spiral shape, and the diameter of the spiral becomes smaller, as close to the resistance film 5. The spring 4 is arranged between the pen tip holder 3 and the resistance film 5. The spring 4 is made of an elastically deformable material, and the touch area is variable according to the movement of the pen tip 1.

The resistance film 5 changes the resistance value thereof according to the touch area between the resistance film 5 and the spring 4, which is conductive. The pen pressure detecting circuit 10, the microcontroller 11, and the infrared output circuit 12 are arranged on the circuit board 6. The battery 7 serves as a power of the input pen 20. The electrode for battery 8 connects the circuit board 6 and the battery 7. These components are covered with the case 9 for protection.

The pen pressure detecting circuit 10 detects the amount of the pen pressure based on the resistance value of the resistance film 5, which alters the resistance value thereof according to a change in the touch area. When a user holds the input pen and is in a writing state, the pen tip 1 and the pen tip holder 3 are pressed by the pen pressure. The spring 4 shrinks according to a pressed amount. The touch area between the spring 4 and the resistance film 5 becomes greater. The pen pressure detecting circuit 10 detects the change in the touch area as the pen pressure information.

The infrared output circuit 12 transmits the pen pressure information to the receiver 30 with infrared rays. The receiver 30 includes a microcontroller 31, and an infrared output receiving circuit 32. The microcontroller 31 controls the whole receiver 30, and obtains the pen pressure information from the infrared rays that are received by the infrared output receiving circuit 32. The microcontroller 31 outputs the pen pressure information to a host machine, which is not shown, and an application on the host machine is capable of altering the line width in drawing according to the pen pressure information. Thus, it is possible to draw several minute expressions of dots, lines, and other strokes including stop, bent, and curve as seen in art of calligraphy and detailed design images.

Figure 3:
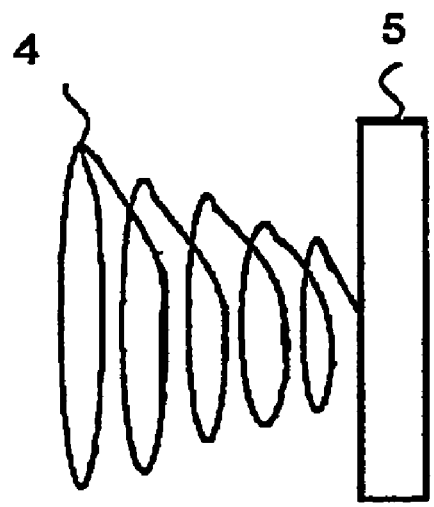
FIG. 3 is a front view in the case where a small pen pressure is applied to a pen tip and a spring slightly shrinks.
Figure 4:
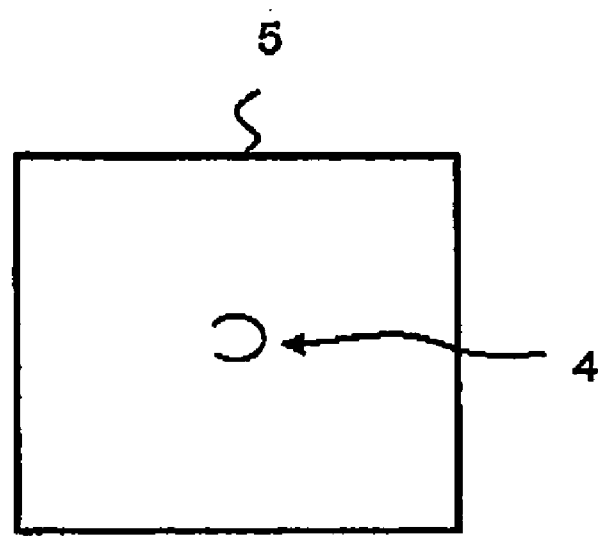
FIG. 4 is a left side view of FIG. 3.

Next, a description will now be given of the touch area of the spring 4. First, a description will be given of the touch area of the spring 4 in the case where the small pen pressure is applied to the pen tip. FIG. 4 is a left side view of FIG. 3. In FIGS. 3 and 4, the referential numeral 4 denotes the spring having a smaller diameter in the spiral shape, as it gets further from the pen tip, and the referential numeral 5 denotes the resistance film. As shown in FIGS. 3 and 4, the touch area between the spring 4 and the resistance film 5 becomes smaller as the pen presser becomes smaller.

Figure 5:
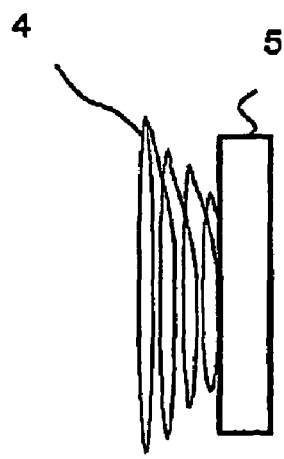
FIG. 5 is a front view in the case where a large pen pressure is applied to the pen tip and the spring greatly shrinks.
Figure 6:
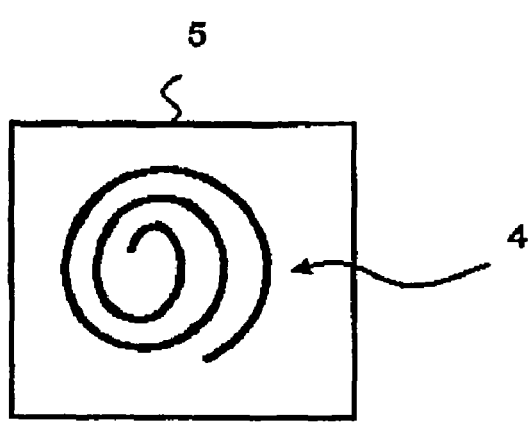
FIG. 6 is a left side view of FIG. 5.

Next, a description will be given of the touch area of the spring 4 in the case where the great pen pressure is applied to the pen tip. FIG. 5 is a front view in the case where the great pen pressure is applied to the pen tip. FIG. 6 is a left side view of FIG. 5. As shown in FIGS. 5 and 6, the touch area between the spring 4 and the resistance film 5 becomes greater as the pen pressure becomes greater. The pen pressure detecting circuit 10 detects the pen pressure applied to the pen tip by detecting the touch area of the spring 4.

Figure 7:
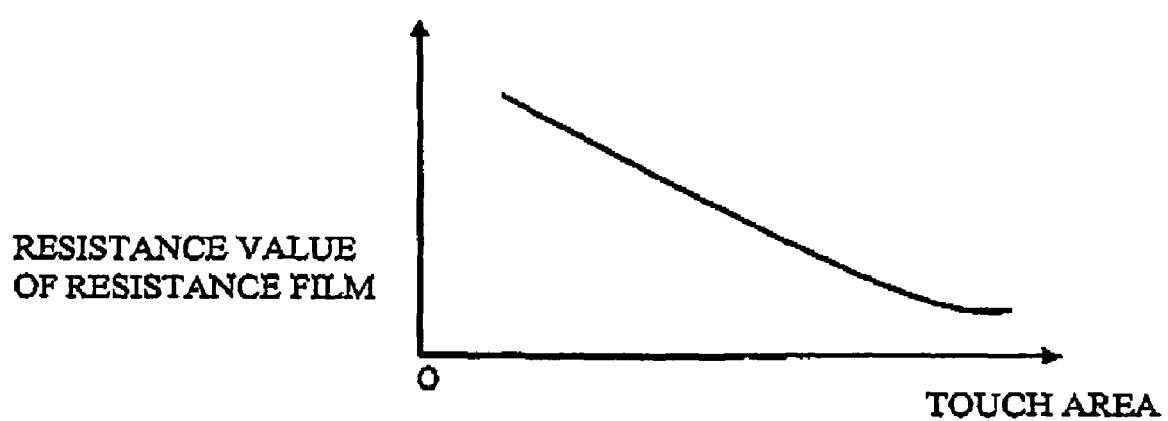
FIG. 7 is a graph describing a relationship between a touch area of the spring and a resistance value of a resistance film.

A description will now be given of a relationship between the touch area between the spring 4 and the resistance value of the resistance film 5. FIG. 7 is a graph describing the relationship between the touch area between the spring 4 and the resistance value of the resistance film 5. Referring to FIG. 7, the resistance value of the resistance film 5 increases, as the pen pressure becomes smaller and the touch area of the spring 4 also becomes smaller. In contrast, the resistance value of the resistance film 5 decreases, as the pen pressure becomes greater and the touch area of the spring 4 also becomes greater.

Figure 8:
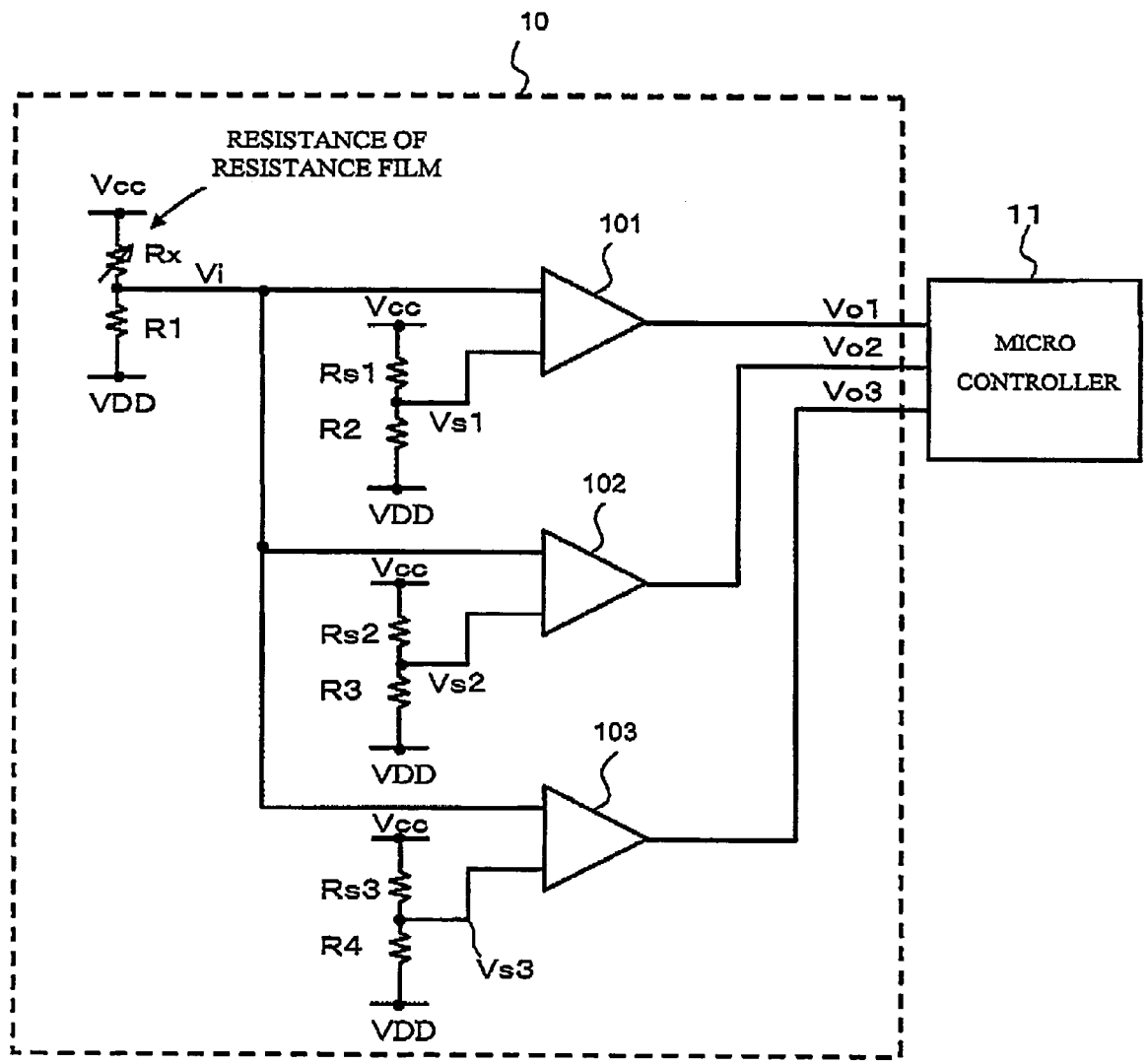
FIG. 8 is a circuitry example of a pen pressure detecting circuit in accordance with the first embodiment of the present invention

Next, a description will now be given of the pen pressure detecting circuit 10. FIG. 8 is a circuitry example of the pen pressure detecting circuit 10 in accordance with the first embodiment of the present invention. Referring to FIG. 8, an Rx denotes a resistor of the resistance film 5. The resistor Rx varies according to the touch area. The pen pressure detecting circuit 10 includes multiple comparators 101, 102, and 103. The resistor Rx and a resistor R1 are connected between power supply voltages Vcc and VDD. A connection point of the resistor Rx and the resistor R1 is respectively connected to one of the respective input terminals of the comparators 101, 102, and 103.

The other input terminal of the comparator 101 is connected to the connection point of resistors Rs1 and R2, which are provided between the power supply voltages Vcc and VDD. The other input terminal of the comparator 102 is connected to the connection point of resistors Rs2 and R3, which are provided between the power supply voltages Vcc and VDD. The other input terminal of the comparator 103 is connected to the connection point of resistors Rs3 and R4, which are provided between the power supply voltages Vcc and VDD. Output terminals of the comparators 101 through 103 are respectively connected to terminals of the microcontroller 11.

With the above-mentioned circuitry, a voltage value Vi is respectively compared with three different thresholds Vs1, Vs2, and Vs3 of the comparators 101, 102, and 103. The voltage value Vi alters, when the resistance value of the resistance film 5, which is the resistor Rx, alters. Here, the thresholds are defined by Vs1>Vs2>Vs3. In the case where the threshold is equal to or greater than the resistance value Vi, the comparators 101, 102, and 103 respectively output Low (0). In the case where the threshold is smaller than the resistance value Vi, the comparators 101, 102, and 103 respectively output High (1). The microcontroller 11 detects three outputs Vo1, Vo2, and Vo3 of the three comparators 101, 102, and 103, and determines the pen pressure applied to the pen tip.

Figure 9:
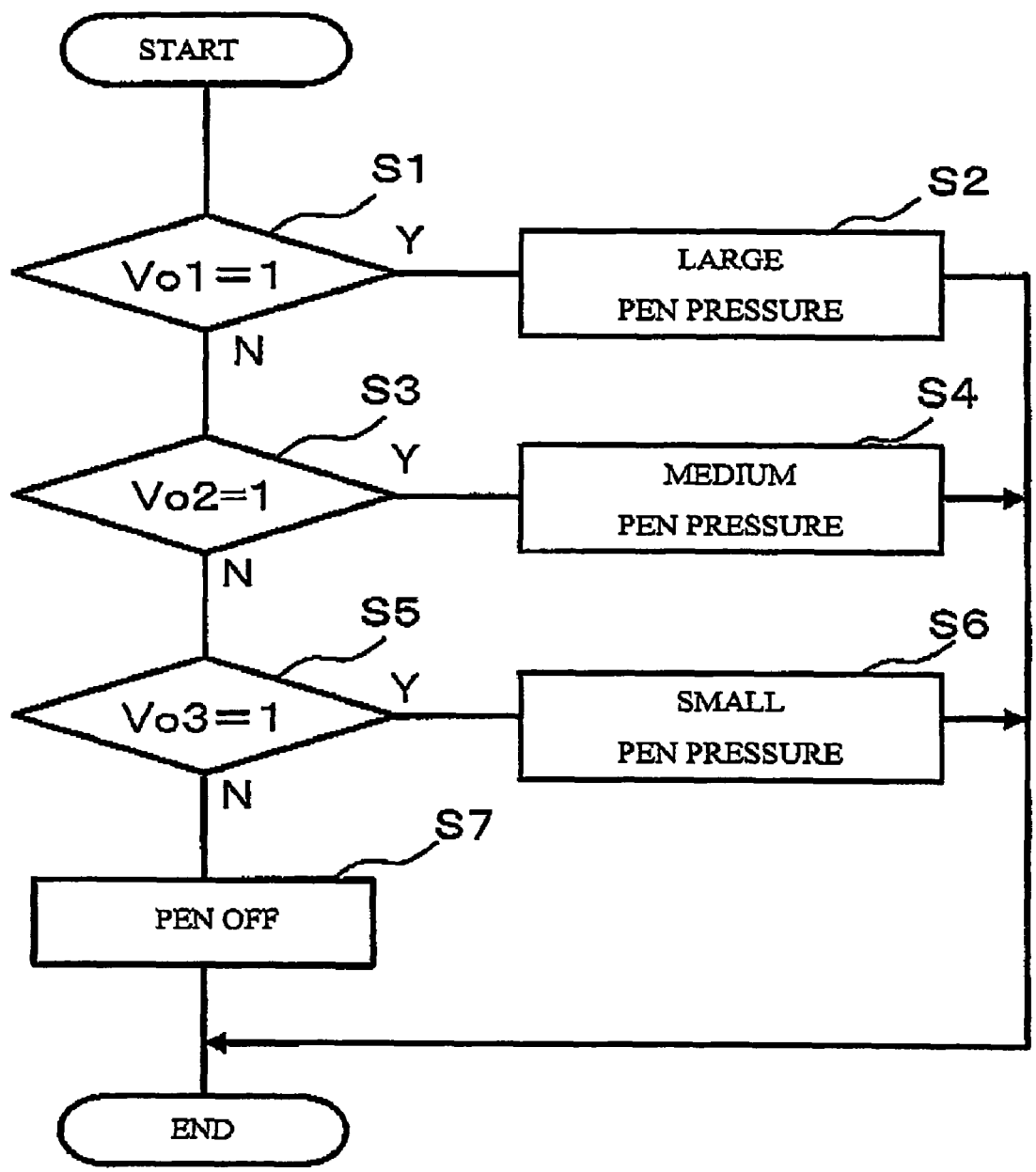
FIG. 9 is a flowchart describing the pen pressure determined by a microcontroller.

Next, a description will be given of the pen pressure determined by the microcontroller 11. FIG. 9 is a flowchart describing the pen pressure determined by the microcontroller 11. In the case where the Vo1 is equal to 1 in step S1, the microcontroller 11 determines that the great pen pressure is applied to the pen tip in step S2. In the case where the Vo1 is equal to 0 in step S1 and the Vo2 is equal to 1 in step S3, the microcontroller 11 determines that a medium pen pressure is applied to the pen tip in step S4. In the case where the Vo1 is equal to 0 in step S1, the Vo2 is equal to 0 in step S3, and Vo3 is equal to 1 in step S5, the microcontroller 11 determines that a small pen pressure is applied to the pen tip in step S6. In the case where the Vo1, the Vo2, and the Vo3 are all 0 the pen is not in a writing state, and accordingly the microcontroller 11 determines that the pen is OFF in step S7.

A description will now be given of the infrared output circuit 12 shown in FIG. 2. FIG. 10 is a circuitry example of the infrared output circuit 12. Referring to FIG. 10, the referential numeral 10 denotes the pen pressure detecting circuit, the referential numeral 11 denotes the microprocessor, and the referential numeral 12 denotes the infrared output circuit. As shown in FIG. 10, the infrared output circuit 12 is equipped with an LED (Light Emitting Diode), an NPN transistor TR, and a resistor R. The transistor TR turns on, if a waveform of a control code applied from the microcontroller 11 is equal to 1, and the transistor TR turns off, if the waveform is equal to 0. The LED is driven by the transistor TR. The LED turns on electricity and outputs infrared signals, if the transistor TR is on.

Next, a description will be given of an infrared pattern outputted from the infrared output circuit 12. FIGS. 11A through 11C show infrared patterns outputted from the infrared output circuit 12. FIG. 11A shows the infrared pulse pattern in the case where the small pen pressure is applied to the pen tip. FIG. 11B shows the infrared pulse pattern in the case where the medium pen pressure is applied to the pen tip. FIG. 11C shows the infrared pulse pattern in the case where the great pen pressure is applied to the pen tip. The infrared output circuit 12 outputs the infrared pattern as shown in FIGS. 11A through 11C, according to the detection made by the microcontroller 11.

As shown in FIG. 11A through 11C, the infrared output circuit 12 expresses differences in the pen pressure applied to the pen tip with the differences in cycle T1, T2, and T3 made by two pulses. The LED turns on, if the pulse is High. The pulse cycle is defined by T1<T2<T3. The small pen pressure is applied to the pen tip, if the cycle T is T1. The medium pen pressure is applied to the pen tip, if the cycle T is T2. The great pen pressure is applied to the pen tip, if the cycle T is T3.

In accordance with the first embodiment of the present invention, the spring 4 shrinks or elongates according to the movement of the pen tip, and the resistance film 5 is fixed steadily. However, the resistance film 5 may move together with the pen tip, and the spring 4 may be fixed steadily. Thus, the spring 4 corresponds to any one of a first member and a second member, and the resistance film 5 corresponds to any one of the first member and the second member.

It is thus possible to detect the amount of the pen pressure applied to the pen tip, based on the touch area that is variable according to the movement of the pen tip, in accordance with the first embodiment of the present invention. It is thereby possible to draw the lines according to the pen pressure. For example, in the case where the great pen pressure is applied, a thick line is drawn. In the case where the small pen pressure is applied, a thin line is drawn.

Second Embodiment

Next, a description will be given of a second embodiment of the present invention. FIG. 12 is a circuit diagram of a pen pressure detecting circuit 110 in accordance with the second embodiment of the present invention. The pen pressure detecting circuit 10 in accordance with the first embodiment of the present invention determines the pen pressure applied to the pen tip with the three comparators 101 through 103. The pen pressure detecting circuit 110 in accordance with the second embodiment of the present invention, however, employs an A/D converter 111 instead of the comparators so as to convert Vi that is an analog signal into a digital signal and indicate the pen pressure information. This makes it possible to determine the amount of the pen pressure in more detail than the pen pressure detecting circuit 10 in accordance with the first embodiment of the present invention. FIGS. 13A through 13C show infrared output patterns of the infrared output circuit 12 in accordance with the second embodiment of the present invention.

The infrared output circuit 12 outputs infrared rays including a start bit at intervals. For instance, if the output pattern is expressed in 000 through 111 after the start bit, eight pen pressure patterns can be expressed with the information obtained from the A/D converter 111. Referring to FIG. 13A, in the case where the output pattern is "1", "001" is set to the output pattern subsequent to the start bit. Referring to FIG. 13B, in the case where the output pattern is "3", "110" is set to the output pattern. Referring to FIG. 13C, in the case where the output pattern is "7", "111" is set to the output pattern. The output pattern is transmitted to the receiver 30. The receiver 30 outputs the pen pressure information that has been received from the input pen 20 to a host machine, and the application on the host machine is capable of expressing the lines having different line widths.

In accordance with the second embodiment of the present invention, various kinds of the pen pressure can be expressed by digitizing the pen pressure pattern with the A/D converter.

Third Embodiment

Figure 14:
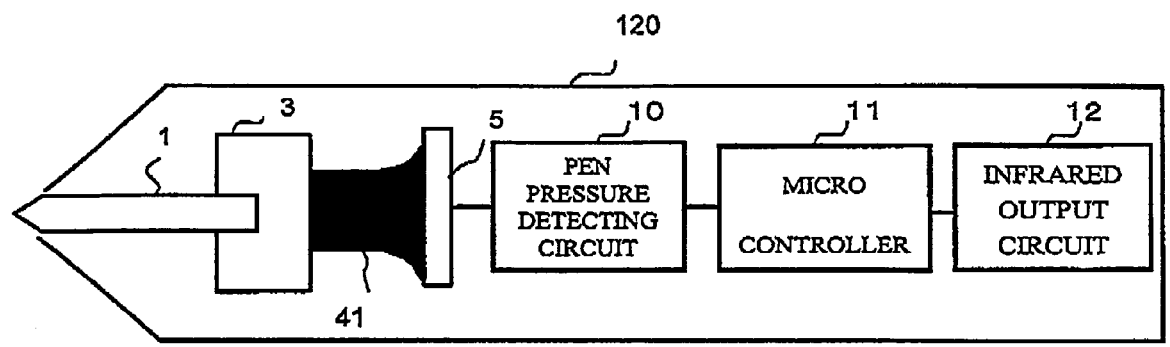
FIG. 14 shows the input pen in accordance with a third embodiment of the present invention.

Next, a description will be given of a third embodiment of the present invention. The spring, which shrinks or elongates according to the pen pressure, has been described above. Rubber is employed instead of the spring in accordance with the third embodiment of the present invention. FIG. 14 shows an input pen 120 in accordance with the third embodiment of the present invention. Referring to FIG. 14, the input pen 120 includes the pen tip 1, the pen tip holder 3, a conductive rubber 41, the resistance film 5, the pen pressure detecting circuit 10, the microcontroller 11, and the infrared output circuit 12. Hereinafter, in the third embodiment, the same components and configurations as those of the first and second embodiments have the same reference numerals and a detailed explanation will be omitted.

The rubber 41 is an elastic material, and is arranged between the pen tip holder 3 and the resistance film 5. The resistance value of the resistance film 5 varies according to the touch area between the resistance film 5 and the rubber 41. The pen pressure detecting circuit 10 obtains the pen pressure information by detecting a change in the resistance value of the resistance film 5.

Figure 15:
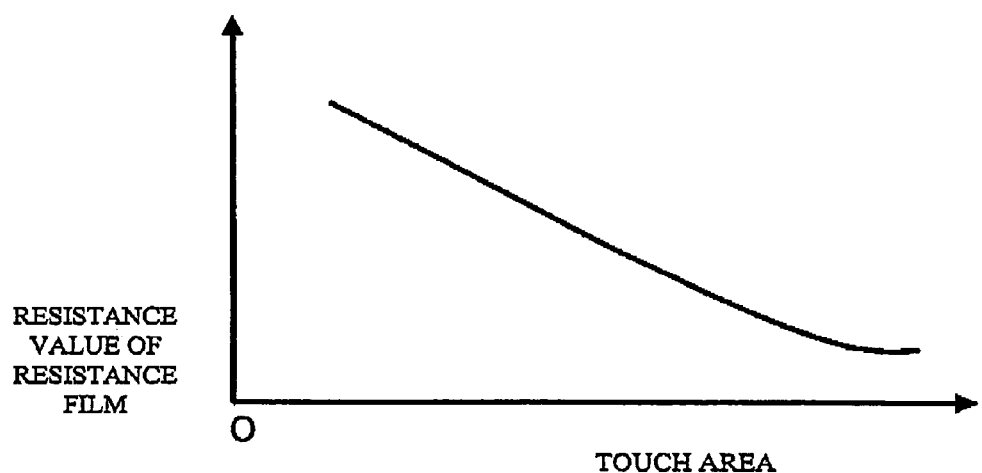
FIG. 15 is a graph describing the relationship between the touch area of a rubber and the resistance value of the resistance film.

FIG. 15 is a graph describing the relationship between the touch area between the rubber 41 and the resistance value of the resistance film 5. Referring to FIG. 15, the resistance value of the resistance film 5 increases, as the touch area of the rubber 41 becomes smaller. In contrast, the resistance value of the resistance film 5 decreases, as the touch area of the rubber 41 becomes greater. Thus, with the rubber, it is capable of altering the touch area according to the movement of the pen tip in accordance with the third embodiment of the present invention.

Fourth Embodiment

Figure 16:
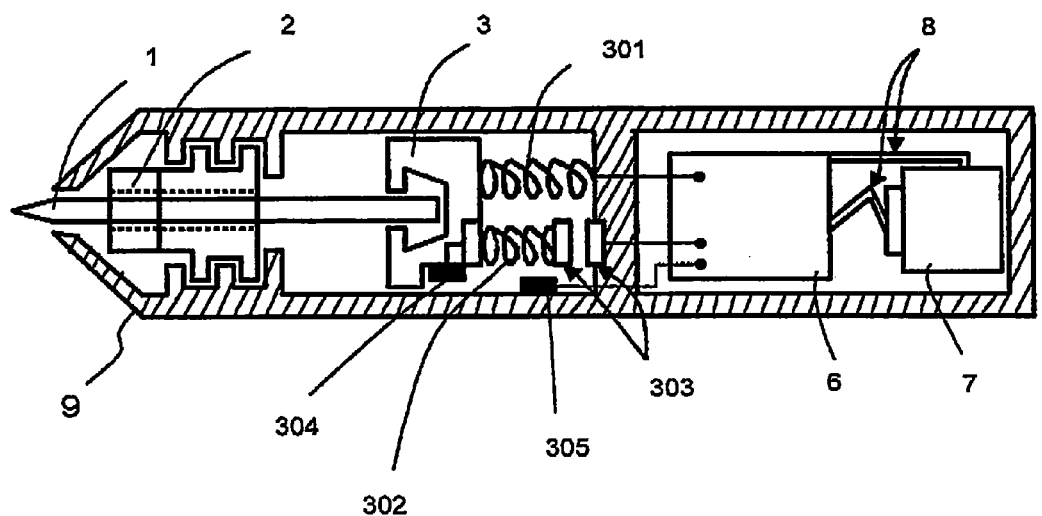
FIG. 16 is a cross-sectional view of the input pen in accordance with a fourth embodiment of the present invention.
Figure 17:
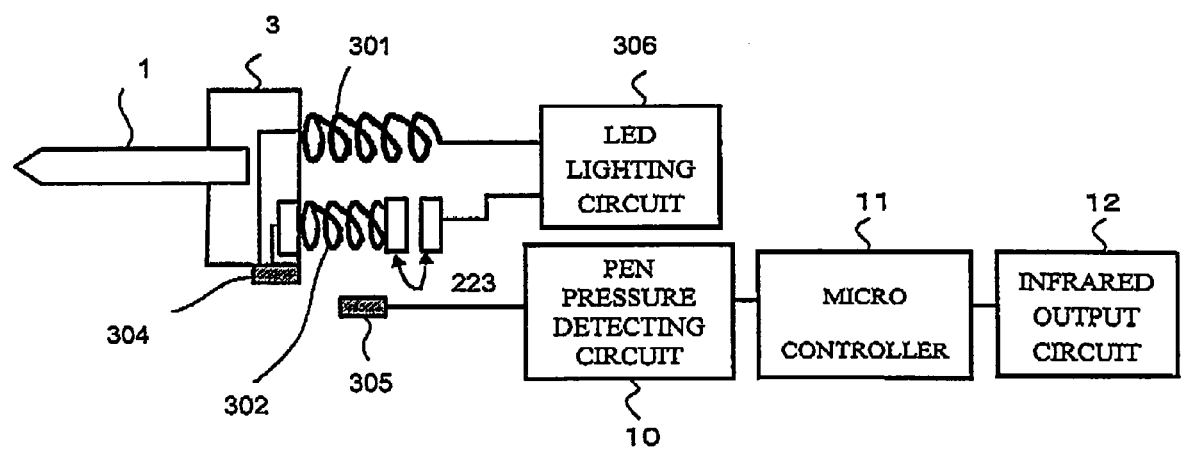
FIG. 17 shows a pen pressure detecting mechanism of the input pen in accordance with the fourth embodiment of the present invention.

Next, a description will be given of a fourth embodiment of the present invention. FIG. 16 is a cross-sectional view of an input pen 220 in accordance with the fourth embodiment of the present invention. FIG. 17 shows the pen pressure detecting mechanism of the input pen 220 in accordance with the fourth embodiment of the present invention. Referring to FIG. 16, the input pen 220 includes the pen tip 1, the ultrasonic sensor 2, the pen tip holder 3, the circuit board 6, the battery 7, the electrodes 8 for battery, the case 9, a first spring 301, a second spring 302, contact points 303, an LED 304, and a photo detector 305.

Referring to FIG. 17, the input pen 220 includes the pen tip 1, the pen tip holder 3, the pen pressure detecting circuit 10, the microcontroller 11, the infrared output circuit 12, the first spring 301, the second spring 302, the contact points 303, the LED 304, the photo detector 305, and an LED lighting circuit 306. Hereinafter, in the fourth embodiment, the same components and configurations as those of the first through third embodiments have the same reference numerals and a detailed explanation will be omitted. The first spring 301 is arranged between the LED lighting circuit 306 and the LED 304, and shrinks or elongates according to the pen pressure applied to the pen tip.

One end of the second spring 302 is connected to the LED 304, and the other end of the second spring 302 is connected to the contact points 303 so that the second spring 302 may shrink or elongate according to the pen pressure applied to the pen tip. The contact points 303 are arranged between the second spring 302 and the LED lighting circuit 306. The LED 304 is a light emitting element that moves together with the pen tip. The LED 304 is installed on a given place on the pen tip holder 3. The photo detector 305 is a light sensitive element, and is installed on a given place inside the input pen 220 to be subjected to the light emitted by the LED 304. The LED lighting circuit 306 controls the lighting of the LED 304.

When the first spring 301 and the second spring 302 shrinks or elongates according to the pen pressure applied to the pen tip, the contact points 303 turn to a short-circuit state from an open state at a certain point. This serves as a drive switch of the LED 304, and thus the LED 304 turns on. The LED 304 is configured to become closer to the photo detector 305, when the first spring 301 and the second spring 302 shrink or elongate.

Figure 18:
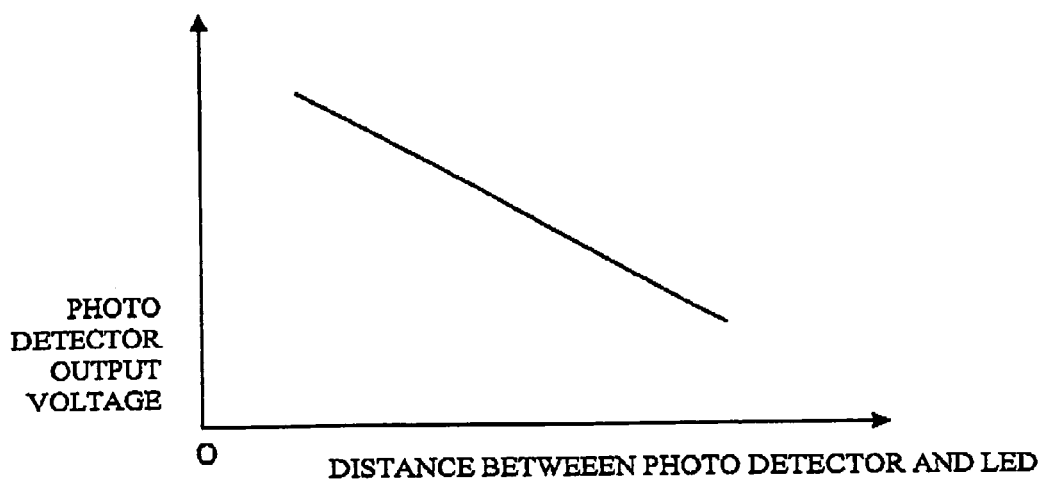
FIG. 18 shows characteristics of output voltages of the photo detector according to a relationship between the distance between a photo detector and an LED.

FIG. 18 shows characteristics of output voltages of the photo detector according to the relationship between the distance between the photo detector 305 and the LED 304. Referring to FIG. 18, the output voltage of the photo detector 305 becomes higher as the distance between the photo detector 305 and the LED 304 becomes closer.

Figure 19A:
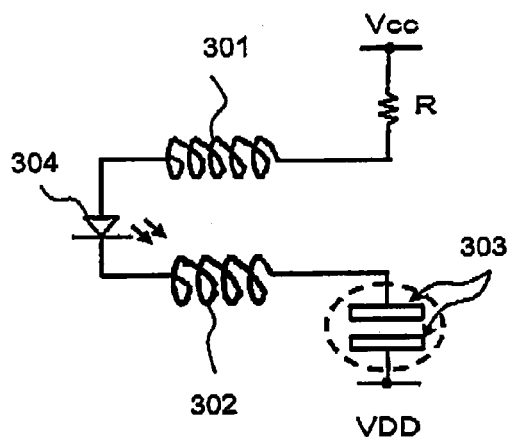
FIGS. 19A through 19C illustrate a lighting principle of an LED.
Figure 19B:
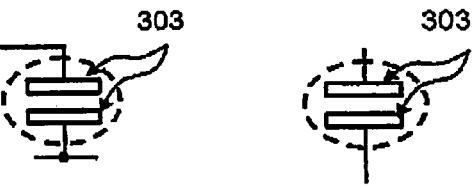
Figure 19C:
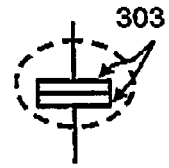

Next, a description will be given of a lighting principle of the LED 304. FIG. 19A illustrates the lighting principle of the LED 304. FIG. 19B illustrates that the contact points are in the open state. FIG. 19C illustrates that the contact points are in the short-circuit state. Referring to FIGS. 19A through 19C, a resistor R, the first spring 301, the second spring 302, the contact points 303, and the LED 304 are connected between the power supply voltages Vcc and VDD. If the first spring 301 and the second spring 302 shrink, the contact points 303 short-circuit and accordingly the LED 304 turns on. In other words, the input pen 220 includes a circuitry that turns on the LED 304 according to the movement of the pen tip. If the pen is not in the writing state, the LED does not turn on so as to cut back the power usage.

Figure 20:
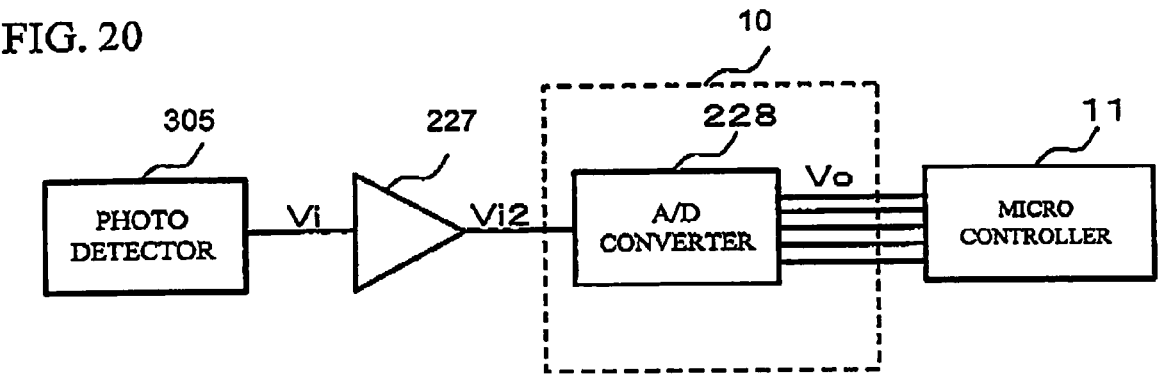
FIG. 20 shows a circuitry example of the pen pressure detecting circuit shown in FIG. 17.

A description will now be given of the pen pressure detecting circuit 10. FIG. 20 shows a circuitry example of the pen pressure detecting circuit 10 shown in FIG. 17. Referring to FIG. 20, the referential numeral 305 denotes the photo detector, the referential numeral 307 denotes the amplifier, the referential numeral 10 denotes the pen pressure detecting circuit, and the referential numeral 11 denotes the microcontroller. An output voltage Vi of the photo detector 305 that is obtained from the LED 304 is amplified to be an output voltage Vi2 by the amplifier 307. The output voltage Vi2 is converted into the digital signals Vo by an A/D converter 308. The microcontroller 11 detects the converted digital signals. Multiple comparators may be employed instead of the A/D converter 308.

It is thus possible to detect the amount of the pen pressure applied to the pen tip based on the amount of light that varies according to the movement of the pen tip. It is thereby possible to express different line widths in drawing according to the amount of the pen pressure.

Fifth Embodiment

Figure 21:
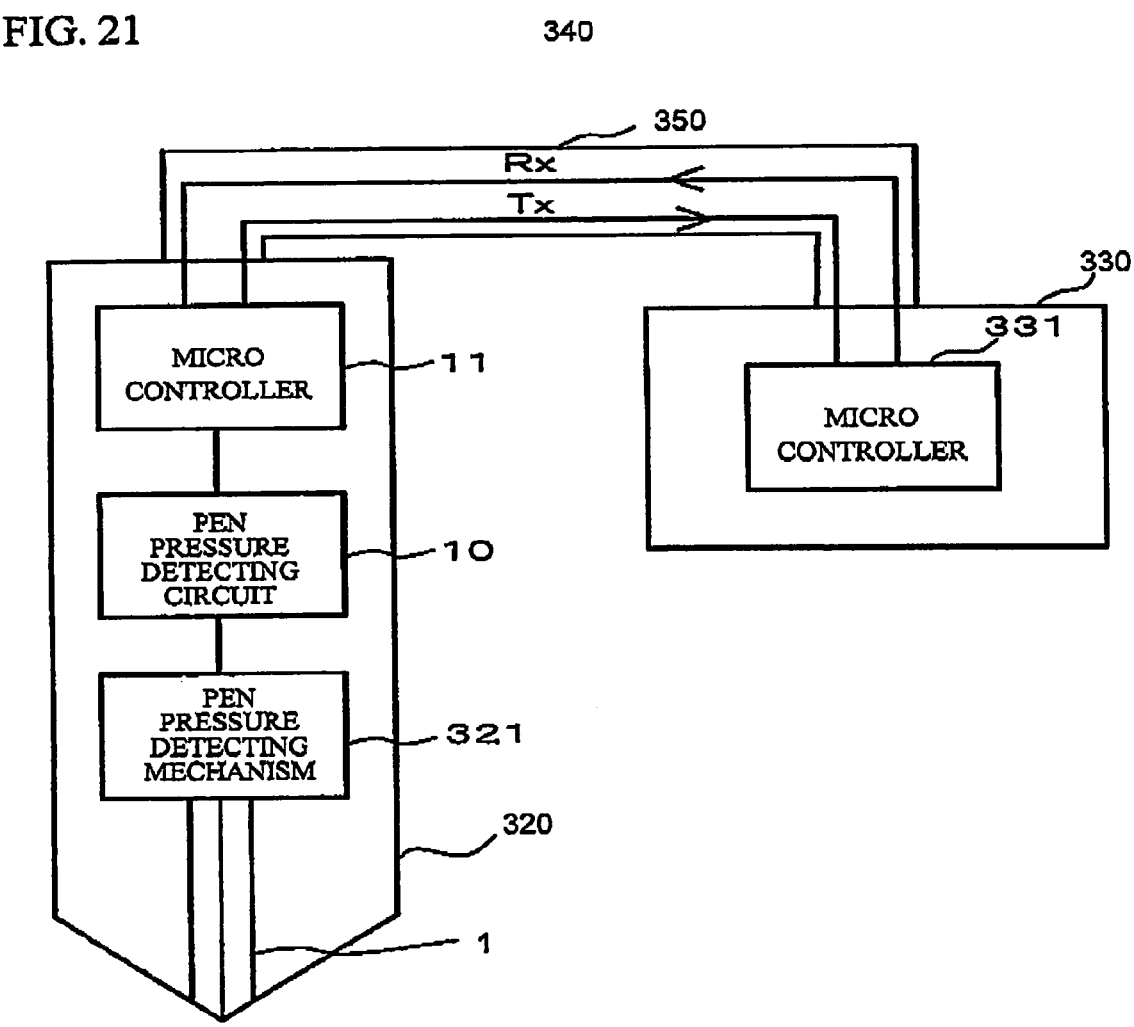
FIG. 21 is a block diagram showing the input device in accordance with a fifth embodiment of the present invention.

Next, a description will be given of a fifth embodiment of the present invention. The infrared rays have been employed for the communication between the input pen and the receiver, as described above. In accordance with the fifth embodiment of the present invention, the input pen and the receiver are connected with a cable. FIG. 21 is a block diagram showing an input device 340 in accordance with the fifth embodiment of the present invention. Referring to FIG. 21, the input device 340 includes an input pen 320 and a receiver 330. The input pen 320 includes the pen tip 1, a pen pressure detecting mechanism 321, the pen pressure detecting circuit 10, and the microcontroller 11. The mechanism described in the first through fourth embodiments, for example, may be applied to the pen pressure detecting mechanism 321 in accordance with the fifth embodiment of the present invention. The input pen 320 determines the pen pressure, which has been detected by the pen pressure detecting circuit 10, with the microcontroller 11, and then transmits the determination result of the pen pressure information to the receiver 330.

The receiver 330 includes a microcontroller 331 to receive the pen pressure information from the input pen 320. The input pen 320 and the receiver 330 are connected with a cable 350. Referential code Tx denotes information that is sent from the input pen 320 to the receiver 330, and the referential code Rx denotes the information that is sent from the receiver 330 to the input pen 320. This information RX includes the information describing that the microcontroller 331 has received the pen pressure information.

It is unnecessary to use the infrared rays by connecting the input pen 320 and the receiver 330 with the cable, in accordance with the fifth embodiment of the present invention. It is thus possible to communicate with digital signals between the microcontroller 11 of the input pen 320 and the microcontroller 331 of the receiver 330.

As described, in accordance with the first through fifth embodiments, the input pen is equipped with the pen pressure detecting mechanism and the pen pressure detecting circuit so as to send the pen pressure information to the receiver. The application on the host machine that is connected to the receiver is thus capable of changing the line width in drawing according to the pen pressure. Thus, it is possible to draw several minute expressions of dots, lines, and other strokes including stop, bent, and curve as seen in art of calligraphy and detailed design images.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An input pen in use for an input device comprising:
   a first member;
   a second member that moves together with a pen tip and touches the first member; and
   a pen pressure detecting circuit that detects an amount of a pen pressure that is applied to the pen tip, based on a touch area between the first member and the second member,
   wherein the first member is a spring that has a diameter of spirals that becomes smaller as a distance from the pen tip increases and varies the touch area according to a movement of the pen tip; and
   the second member is a resistance film having a resistance that depends on the touch area.

2. The input pen as claimed in claim 1 wherein the pen pressure detecting circuit includes any one of multiple comparators and an A/D converter.

3. The input pen as claimed in claim 1, further comprising an infrared output circuit that outputs to a given receiver, an amount of the pen pressure detected by the pen pressure detecting circuit, with the use of infrared rays.

4. The input pen as claimed in claim 3, wherein the infrared output circuit expresses the amount of the pen pressure by changing an interval between infrared pulses.

5. An input device comprising:
   an input pen; and
   a receiver,
   wherein the input pen in use for an input device includes a first member, a second member that moves together with a pen tip and touches the first member, and a pen pressure detecting circuit that detects an amount of a pen pressure that is applied to the pen tip, based on a touch area between the first member and the second member;
   wherein the first member is a spring that has a diameter of spirals that becomes smaller as a distance from the pen tip increases and varies the touch area according to a movement of the pen tip; and
   the second member is a resistance film having a resistance that depends on the touch area.

* * * * *